(12) United States Patent
Mamae

(10) Patent No.: US 7,712,244 B2
(45) Date of Patent: May 11, 2010

(54) APPARATUS AND METHOD FOR FISHING

(76) Inventor: Tautofi Taurik'i Mamae, 14 Rosyln Avenue, Brighton Le Sands, New South Wales (AU) 2216

( * ) Notice: Subject to any disclaimer, the term of this patent is extended or adjusted under 35 U.S.C. 154(b) by 404 days.

(21) Appl. No.: 11/595,840

(22) Filed: Nov. 9, 2006

(65) Prior Publication Data

US 2007/0251136 A1 Nov. 1, 2007

Related U.S. Application Data

(63) Continuation-in-part of application No. PCT/AU2005/000103, filed on Jan. 31, 2005.

(30) Foreign Application Priority Data

May 10, 2004 (AU) ............................... 2004902457

(51) Int. Cl.
A01K 91/02 (2006.01)

(52) U.S. Cl. ..................... 43/19; 89/7; 124/56; 124/60; 124/70

(58) Field of Classification Search ..................... 43/19; 89/7; 124/56, 57, 60, 69–71, 74
See application file for complete search history.

(56) References Cited

U.S. PATENT DOCUMENTS

| | | | | |
|---|---|---|---|---|
| 859,562 A | * | 7/1907 | Johnson | 42/55 |
| 1,016,212 A | * | 1/1912 | Clark | 43/19 |
| 1,219,703 A | * | 3/1917 | Clark | 89/7 |
| 1,245,074 A | * | 10/1917 | Ward | 43/19 |
| 1,306,012 A | * | 6/1919 | Jackson | 89/7 |
| 1,336,088 A | * | 4/1920 | Poremba | 43/18.1 CT |
| 1,343,456 A | * | 6/1920 | Jones | 89/7 |
| 1,383,111 A | * | 6/1921 | Hall et al. | 89/7 |
| 1,406,268 A | * | 2/1922 | Madej | 43/18.1 CT |
| 1,442,813 A | | 1/1923 | Lobit | |
| 1,863,062 A | * | 6/1932 | MacDonald | 89/7 |
| 1,883,028 A | * | 10/1932 | Smith | 42/55 |
| 1,998,023 A | * | 4/1935 | Peake | 42/55 |
| 1,999,357 A | * | 4/1935 | Driggs, Jr. | 42/55 |
| 2,090,731 A | * | 8/1937 | Klein | 43/19 |

(Continued)

FOREIGN PATENT DOCUMENTS

DE 2908315 A 9/1980

(Continued)

*Primary Examiner*—Darren W Ark
(74) *Attorney, Agent, or Firm*—Knobbe Martens Olsen & Bear LLP

(57) ABSTRACT

An apparatus for releasable attachment to a fishing rod, said apparatus including:
  a barrel having a first end and a releasably sealed first region;
  wherein the first region of the barrel includes a space within the barrel substantially bounded by a second end of the barrel and a protrusion disposed inside the barrel; and
  a means of selectably adjusting the volume of the first region
  including adjusting the position of the protrusion along a length of the barrel; and wherein when the protrusion is disposed inside the barrel, it extends radially-inwardly of the barrel in a substantially transverse orientation to an elongate axis of the barrel; and
  a means of controllably feeding a propellant into the releasably sealed first region; and
  a means of expanding the propellant whereby the said expansion of the propellant causes a projectile disposed within the barrel to be propelled outwardly of the barrel via the first end.

50 Claims, 8 Drawing Sheets

U.S. PATENT DOCUMENTS

| | | | | |
|---|---|---|---|---|
| 2,094,854 A * | 10/1937 | Smith | | 89/7 |
| 2,158,396 A * | 5/1939 | Birnstock | | 43/19 |
| 2,225,719 A * | 12/1940 | Shotton | | 43/19 |
| 2,324,860 A * | 7/1943 | Mannigel | | 42/55 |
| 2,605,569 A * | 8/1952 | Kronhaus et al. | | 43/19 |
| 2,754,607 A * | 7/1956 | Wily | | 89/7 |
| 2,856,911 A * | 10/1958 | Maxwell | | 43/19 |
| 2,924,211 A * | 2/1960 | McSwain | | 43/19 |
| 2,932,111 A * | 4/1960 | Kremski et al. | | 43/19 |
| 2,947,221 A * | 8/1960 | Griffin et al. | | 89/7 |
| 2,952,091 A * | 9/1960 | Blanchard | | 43/19 |
| 2,958,975 A * | 11/1960 | Neff et al. | | 43/19 |
| 2,977,706 A * | 4/1961 | Merz | | 43/19 |
| 3,015,182 A * | 1/1962 | Tuttle et al. | | 43/19 |
| 3,026,644 A * | 3/1962 | Raider | | 43/19 |
| 3,059,630 A * | 10/1962 | Oreskey | | 43/19 |
| 3,139,794 A * | 7/1964 | Barnes, Jr. et al. | | 124/56 |
| 3,147,562 A * | 9/1964 | Pachmayr et al. | | 42/74 |
| 3,160,976 A * | 12/1964 | Pachmayr | | 42/74 |
| 3,255,548 A * | 6/1966 | Whritenour | | 43/19 |
| 3,255,669 A * | 6/1966 | Olofsson | | 89/7 |
| 3,261,123 A * | 7/1966 | Gugliotta | | 43/19 |
| 3,263,359 A * | 8/1966 | Pachmayr | | 42/74 |
| 3,292,295 A * | 12/1966 | Saltness | | 43/19 |
| 3,343,455 A * | 9/1967 | Lohr | | 89/7 |
| 3,346,984 A * | 10/1967 | Lohr | | 89/7 |
| 3,365,834 A * | 1/1968 | Kreft | | 43/19 |
| 3,412,497 A * | 11/1968 | Denton et al. | | 42/54 |
| 3,419,991 A * | 1/1969 | Mitchell | | 43/19 |
| 3,605,316 A | 9/1971 | Rogers | | |
| 3,717,947 A * | 2/1973 | Nomura | | 43/19 |
| 3,728,937 A * | 4/1973 | Nelson et al. | | 89/7 |
| 3,745,691 A * | 7/1973 | Brown, Jr. | | 89/7 |
| 3,780,720 A * | 12/1973 | Alderson | | 124/74 |
| 3,828,459 A * | 8/1974 | Easom | | 43/19 |
| 3,834,056 A * | 9/1974 | Filippi et al. | | 43/19 |
| 3,855,988 A * | 12/1974 | Sweeton | | 124/56 |
| 3,938,272 A * | 2/1976 | Ditto et al. | | 89/7 |
| 3,962,813 A * | 6/1976 | Moon | | 43/19 |
| 3,974,591 A | 8/1976 | Ray | | |
| 4,005,632 A * | 2/1977 | Holtrop | | 89/7 |
| 4,050,348 A * | 9/1977 | Graham | | 89/7 |
| 4,056,859 A * | 11/1977 | Pace | | 43/19 |
| 4,100,836 A * | 7/1978 | Hofmann | | 89/7 |
| 4,132,024 A * | 1/1979 | Pachmayr et al. | | 42/74 |
| 4,148,245 A * | 4/1979 | Steffanus et al. | | 89/7 |
| 4,161,133 A * | 7/1979 | Black et al. | | 89/7 |
| 4,222,307 A * | 9/1980 | Roettges et al. | | 89/37.05 |
| 4,369,592 A * | 1/1983 | Perry | | 42/54 |
| 4,501,085 A * | 2/1985 | Barnes | | 43/19 |
| 4,631,852 A * | 12/1986 | Whritenour | | 43/19 |
| 4,644,987 A * | 2/1987 | Kiang | | 42/74 |
| 4,664,631 A * | 5/1987 | Pederson et al. | | 89/7 |
| 4,756,113 A * | 7/1988 | Eggertson et al. | | 43/19 |
| 4,773,179 A * | 9/1988 | Corley | | 43/19 |
| 4,848,022 A * | 7/1989 | Ozeki et al. | | 43/23 |
| 5,060,413 A * | 10/1991 | Garcia | | 43/19 |
| 5,079,987 A * | 1/1992 | Pate et al. | | 89/7 |
| 5,131,313 A * | 7/1992 | Zimmerman | | 89/7 |
| 5,149,907 A * | 9/1992 | Thiesen | | 89/7 |
| 5,193,298 A * | 3/1993 | O'Neill | | 43/19 |
| 5,319,875 A | 6/1994 | Brandolino | | |
| 5,365,913 A * | 11/1994 | Walton | | 124/60 |
| 5,421,116 A * | 6/1995 | Moon | | 43/19 |
| 5,491,924 A * | 2/1996 | Athanasiadis | | 43/19 |
| 5,507,271 A * | 4/1996 | Actor | | 124/56 |
| 5,652,405 A * | 7/1997 | Rakov | | 89/7 |
| 5,660,160 A * | 8/1997 | Prescott, Jr. | | 124/70 |
| 5,689,909 A * | 11/1997 | Cheney, Jr. | | 43/19 |
| 5,735,074 A * | 4/1998 | Stauffer | | 43/19 |
| 5,823,894 A * | 10/1998 | Actor | | 124/56 |
| 5,887,578 A * | 3/1999 | Backeris et al. | | 124/56 |
| 6,192,612 B1* | 2/2001 | Maier et al. | | 89/7 |
| 6,212,988 B1* | 4/2001 | Chernyshov et al. | | 89/7 |
| 6,223,642 B1* | 5/2001 | O'Dwyer | | 89/7 |
| 6,247,260 B1 | 6/2001 | Kandlbinder et al. | | |
| 6,276,353 B1* | 8/2001 | Briggs et al. | | 124/71 |
| 6,497,066 B1* | 12/2002 | Harrison | | 43/19 |
| 6,761,157 B2* | 7/2004 | Bartek | | 124/56 |
| 7,334,367 B2* | 2/2008 | Moss et al. | | 43/19 |
| 7,409,794 B2* | 8/2008 | Triano et al. | | 43/19 |
| 2002/0139239 A1* | 10/2002 | Vogl | | 89/1.34 |
| 2004/0031382 A1* | 2/2004 | Ogram | | 89/7 |
| 2004/0068916 A1 | 4/2004 | Harris | | |
| 2004/0139647 A1* | 7/2004 | Esberger | | 43/19 |
| 2005/0108919 A1* | 5/2005 | Staelens et al. | | 43/19 |
| 2006/0032487 A1* | 2/2006 | Tippmann et al. | | 124/74 |
| 2006/0185219 A1* | 8/2006 | Giordano et al. | | 43/19 |
| 2007/0214705 A1* | 9/2007 | Osenbauch et al. | | 43/19 |
| 2008/0190275 A1* | 8/2008 | Tippmann | | 89/7 |
| 2009/0056193 A1* | 3/2009 | Croisetiere | | 43/19 |
| 2009/0178328 A1* | 7/2009 | Jelnicki, Jr. | | 43/19 |
| 2009/0178329 A1* | 7/2009 | Jelnicki, Jr. | | 43/19 |

FOREIGN PATENT DOCUMENTS

| | | |
|---|---|---|
| EP | 317317 A1 * | 5/1989 |
| FR | 2664468 A1 * | 1/1992 |
| GB | 2092873 A | 8/1982 |
| GB | 2155291 A * | 9/1985 |
| GB | 2196821 A | 5/1988 |
| JP | 09028258 A * | 2/1997 |
| NZ | 522351 A | 3/2004 |
| WO | WO 8403022 A1 * | 8/1984 |
| WO | WO 2004064514 A1 * | 8/2004 |
| WO | WO 2007109151 A2 * | 9/2007 |

* cited by examiner

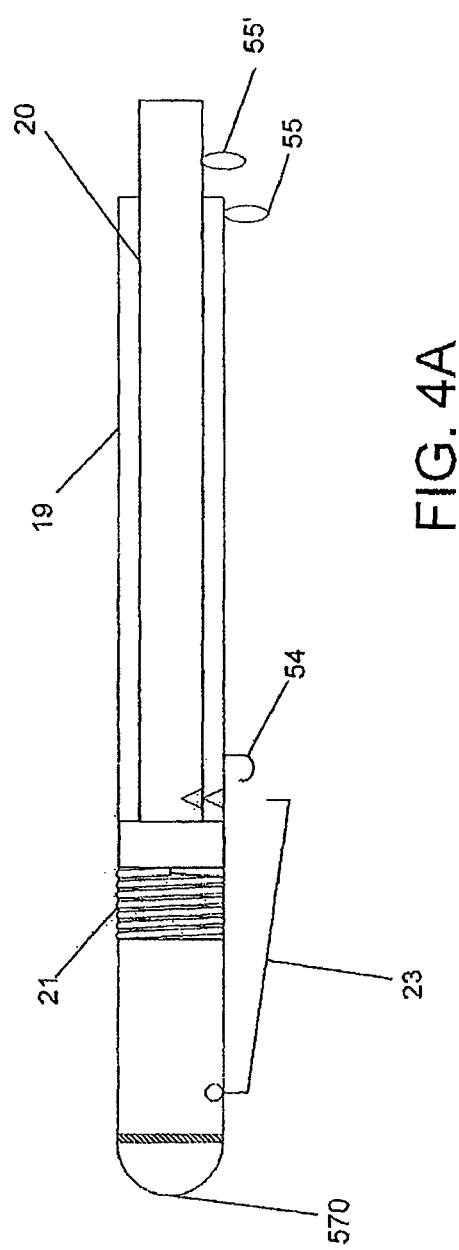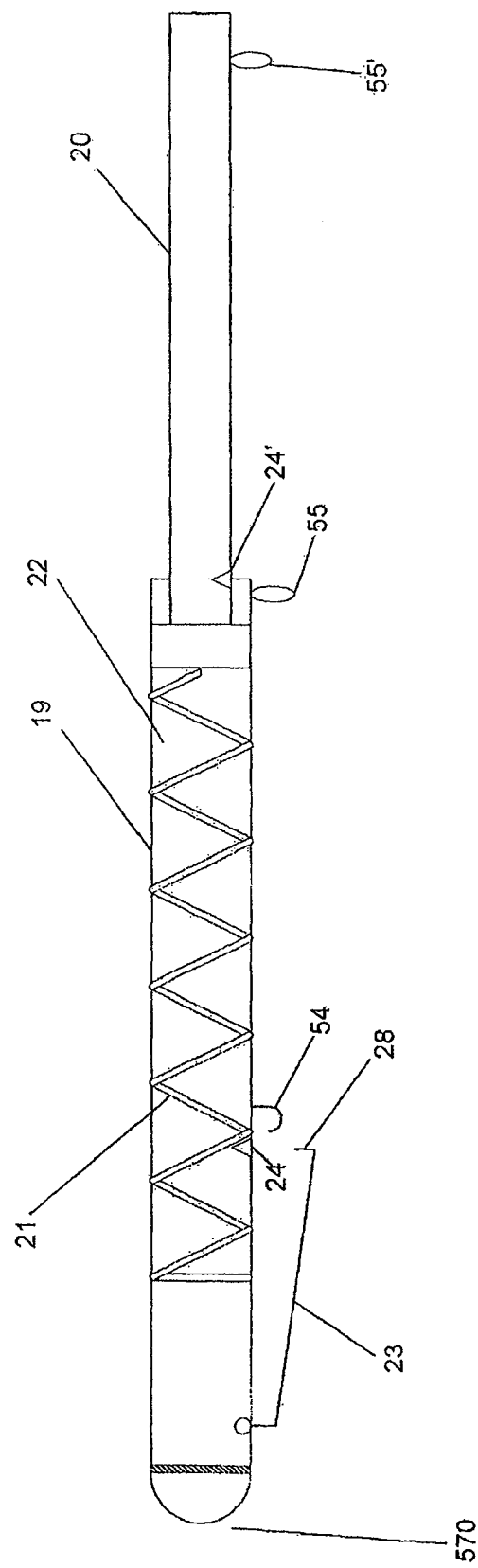
FIG. 4A
FIG. 4B

APPARATUS AND METHOD FOR FISHING

CROSS REFERENCE TO RELATED APPLICATIONS

This application is a continuation in part of PCT/AU2005/000103, filed on Jan. 31, 2005, published in English as WO 2005/107449, the entire disclosure of which is hereby incorporated by reference in its entirety.

TECHNICAL FIELD

The present invention relates to an apparatus for, and method of propelling objects. In particular, the present invention relates to an apparatus for, and method of, propelling objects from a fishing rod.

BACKGROUND OF THE INVENTION

Fishing is a popular recreational activity which typically involves the use of a fishing rod to cast a baited hook, line and sinker into a body of water in order to catch a fish. More specifically, the conventional technique of casting out a fishing line involves swinging the fishing rod through an arc and allowing the momentum of the sinker to carry an attached hook, line and bait out into the body of water.

However, difficulties tend to arise in relation to the prior art in that certain individuals may often lack the physical strength and/or coordination to swing the rod in such a way as to enable the hook, line and sinker to be sufficiently propelled in to the water.

Also, in a cramped environment where numerous individuals may be fishing within a confined space (e.g. on a fishing boat) it may be impracticable to swing the fishing rod as the line may become entangled with other nearby fishing lines or adjacent obstructions. Moreover, it may be dangerous to swing the rod in a cramped environment as there is a risk that a bystander might be struck and injured.

A further problem with the prior art is that it may often be difficult to control the direction and distance to which a line is cast by swinging a fishing rod. This problem is particularly evident where an individual is inexperienced in the sport of fishing and is unable to properly control the distance and direction in which the line is cast.

Fishing can occasionally be a dangerous recreation particularly when fishing in close proximity to a dangerous body of water. For instance, activities such as rock-fishing are responsible for a number of deaths each year throughout the world. However, it tends to be difficult to cast out the fishing line in to the body of water using conventional means and methods without being at the water's edge.

There are other problems also associated with the sport of fishing. One area of difficulty relates to the use of burly in a body of water in order to attract fish. In particular, it is desirable for a fisherman to be able to disperse the burley within proximity of the fishing hook and bait so as to increase the chances of catching a fish. However, this is often difficult to achieve given the effects of the tides and other environmental conditions which may disperse the burley in a random manner.

SUMMARY OF THE INVENTION

The present invention seeks to provide an apparatus for, and a method of, alleviating at least one of the above-mentioned problems.

In a first broad form, the present invention provides an apparatus for releasable attachment to a fishing rod, said apparatus including:
   a barrel having a first end and a releasably sealed first region;
   wherein the first region of the barrel includes a space within the barrel substantially bounded by a second end of the barrel and a protrusion disposed inside the barrel; and
   a means of selectably adjusting the volume of the first region including adjusting the position of the protrusion along a length of the barrel;
   a means of feeding a propellant into the releasably sealed first region; and
   a means of expanding the propellant whereby the said expansion of the propellant causes a projectile disposed within the barrel to be propelled outwardly of the barrel via the first end.

Preferably, the barrel includes a pipe having a cylindrical cross-section. Also preferably, the barrel includes a polyvinyl chloride material.

Preferably, the propellant includes butane. Typically, the propellant includes a mixture of butane gas and air.

Preferably, when the first region of the barrel is releasably sealed, it substantially prevents the propellant disposed within the first region from escaping.

Preferably, the first region of the barrel is releasably sealed by the projectile loaded in to the barrel via the first end, whereby the projectile abuts against the protrusion protruding into the barrel so as to prevent the propellant disposed within the first region from escaping. Typically, the projectile will form an airtight seal within the protrusion.

Typically, the projectile includes at least one of:
   a sinker;
   a burly pellet.

Preferably, the propellant is fed into the first region of the barrel from a canister.

Preferably, the canister is able to be mounted to the barrel, whereby propellant within the canister is able to be delivered into the barrel.

Preferably, the present invention includes a cap removably attachable to the second end of the barrel.

Preferably, the present invention includes a shock-absorbent material. More preferably, the shock-absorbent material includes at least one of:
   a gel; or
   rubber;

Typically, the shock-absorbent absorbent material is disposed on the cap.

Preferably, the cap includes a pressure valve to allow at least a portion of the expanding propellant to escape from the first region of the barrel when a pressure level within the first region of the barrel exceeds a predetermined threshold pressure level.

Preferably, the means of expanding the propellant includes an ignition means for igniting the propellant. Preferably, the ignition means includes a spark plug.

Preferably, the present invention also includes a trigger for triggering the ignition means. Typically, the trigger means is adjustably positionable relative to the barrel.

In certain embodiments of the present invention, the ignition means may be adapted to ignite the propellant within the first region of the barrel at disparate locations around the first region. For instance, a plurality of spark plugs may be mounted on the barrel so as to be able to ignite propellant at various positions along a length of the first region of the barrel. The ignition means may be adapted to ignite the propellant at different locations within the first region either selectively, or concurrently.

Typically, where the ignition means is required to selectively ignite propellant at different locations in the first region of the barrel, a switch may be employed to control which of the plurality of spark plugs or the like are to be fired within the first region of the barrel at any given time so as to ignite the propellant. Advantageously, the ignition means may assist in providing an even distributed ignition of the propellant within the first region of the barrel, particularly when the size of the first region has been relatively expanded.

Preferably, the present invention includes an attachment means for releasably attaching the apparatus to a fishing rod. Typically, the attachment means includes a clamp. Alternatively, the attachment means may include a means of slidably engaging the present invention with the fishing rod. For instance this may include a prong disposed on the rod, and a bracket disposed on the apparatus which is adapted to slidably receive the prong.

There may also be a locking mechanism to hold the prong within the bracket until it is removed by the user.

Also preferably, when the present invention is detached from the fishing rod, the present invention may include a means of releasably mounting the present invention to a structure such as a boat railing, a rock outcrop and so on. For instance, a clamp may be used to clamp the present invention to a suitable structure. Advantageously, the present invention may allow a user to use the present invention hands-free at least part of the time.

Preferably, the present invention includes a removably attachable handle grip. Typically, the present invention includes a pair of removably attachable handle grips.

Preferably, the present invention includes a means of adjusting the length of the barrel. Preferably, the means of adjusting the length of the barrel includes a barrel extension which is releasably attachable to the barrel. More preferably, the barrel extension is attachable to the barrel by screwing the barrel extension on to the first end of the barrel. The barrel extension may include a different diameter to the barrel. Advantageously, the barrel extension may allows for a wider variety of projectiles such as sinkers and/or burley pellets to be accommodated by the present invention.

Preferably, the present invention includes a retaining means for releasably retaining the projectile within the barrel and/or the barrel extension before it is propelled. Typically this may include a depressable tab protruding into the barrel and/or barrel extension wherein said depressable tab may be depressed when the projectile is loaded in to the barrel and the projectile passes by the depressable tab. Once the projectile has passed by the depressable tab, the depressable tab may return to its initial position whereby the projectile is substantially retained in the barrel until propelled from the barrel whereby the depressable button offers little resistance to the propelled projectile and is depressed once more to let the projectile escape.

The present invention may include a handle which is releasably engageable with the apparatus, the handle including:

a first end and a second end, the first end of the handle being releasably engageable with the second end of the barrel;
a housing adapted for releasably receiving a propellant canister; and
a means of selectably moving the propellant canister within the housing between at least a first and a second position wherein, when the propellant canister is arranged in the first position, the propellant canister engages with the barrel so that propellant is able to be supplied into the first region of the barrel, and, when arranged in the second position, the propellant canister is disengaged from the barrel so that propellant is not able to be supplied into the first region of the barrel.

Preferably, the handle includes an outer surface adapted for gripping by a user's hand. Typically the outer surface may include a rubber layer.

Preferably, the handle includes a means of mounting a fishing line spindle on the outer surface.

Preferably, the means of selectably moving the propellant canister within the housing includes:

a depressable button extending inwardly of the housing from the outer surface, whereby when pressed inwardly of the housing, the depressable button is adapted to abut against a rear of the propellant canister so as to force the propellant canister towards the second end of the barrel and into the first position within the housing; and
a biasing means disposed between the propellant canister and the barrel which urges the propellant canister away from the second end of the barrel into the second position when the depressable button is released by the user.

Typically, the biasing means may include a spring.

Preferably, the handle includes an opening at the second end including a cap for covering the second end. Typically, the propellant canister is able to be slidably inserted into the housing via the opening when the cap is removed. Preferably, the propellant canister may be pushed into the housing via the opening by a user's finger so that the canister passes the depressable button and is disposed between the depressable button and the first end of the handle.

Preferably, the handle may include a shape characteristic resembling a fishing rod handle. Advantageously, the handle, when attached to the apparatus may provide a user with the perception that he/she is holding a fishing rod. Moreover, it may provide the user with substantially the same comfort, feel and familiarity with which the user has become accustomed to when holding a conventional fishing rod.

In a second broad form, the present invention provides a method of propelling a projectile from a fishing rod, said method including the steps of:

(i) feeding a propellant into a releasably sealable first region of a barrel, said barrel including a first end;
(ii) expanding the propellant whereby the said expanding propellant causes a projectile disposed within the barrel to be propelled outwardly of the barrel via the first end of the barrel.

In a third broad form, the present invention provides a fishing rod including:

a first part coupled to a second part wherein said first and second parts are arrangeable relative to each other between at least a first and a second position;
wherein when disposed in the first position, the second part is retracted relative to the first part;
and when disposed in the second position, the second part is extended relative to the first part;
a biasing means for biasing the first part and second part into the second position;
and a releasable securement means for holding the first part and the second part in the first position, whereby release of said securement means allows the first and second parts to be urged into the second position as a result of the biasing means.

Preferably the second part may be slidably or pivotably extendable and/or retractable relative to the first part of the fishing rod.

Preferably, the releasable securement means includes a latch.

Preferably, a plurality of eyelets are disposed along the length of the second part adapted for securing a fishing line. More preferably, the eyelets may be adapted to be pivotably folded against the second part.

Also preferably, the eyelets may be spring-biased such that they tend to extend substantially perpendicularly relative to the second part. Thus, for instance, where the second part is retracted in to the first part in telescopic fashion, the eyelets may compactly flip down on to the second part to allow for compact housing of the second part within the first part, and, then spring back into substantially perpendicular orientation relative to the second part when the second part is extended out of the first part.

In a fourth broad form, the present invention includes a method of controllably dispensing burley in water, said method including the steps of:
  (i) inserting a burley tablet into a permeable enclosure via a releasably sealable opening disposed on the permeable enclosure, said burley tablet being adapted to disintegrate upon contact with water into burley sub-particles having relatively smaller dimensions than the burley tablet;
  (ii) submerging the permeable enclosure into the water wherein, upon disintegration of the burley tablet into burley sub-particles, the burley sub-particles are able to be dispensed from the permeable enclosure via a permeable surface of the permeable enclosure whilst the permeable surface substantially retains the burley tablet internally of the enclosure.

Preferably, the permeable enclosure includes a rigid plastic material.

Also preferably, the present invention includes the step of attaching the permeable enclosure to a fishing line, wherein the permeable enclosure is able to be cast out as part of the fishing rig.

Preferably, the present invention includes the further step of floating at least a portion of the permeable enclosure substantially at the surface of the water.

In a fifth broad form, the present invention includes a burley dispenser for controllably dispensing burley in water including:
  a permeable enclosure having a releasably sealable opening via which a burley tablet is able to be inserted into the permeable enclosure;
  said burley tablet being adapted to disintegrate upon contact with water into burley sub-particles having relatively smaller dimensions than the burley tablet;
  whereby the burley sub-particles are able to flow outwardly of the permeable enclosure via a permeable surface of the permeable enclosure whilst the permeable surface substantially retains the burley tablet internally of the enclosure.

Preferably, the permeable enclosure includes a rigid plastic material.

Preferably, the present invention includes a means of attaching the burley dispenser to a fishing line whereby the burley dispenser is able to be cast out as part of a fishing rig which is propelled from the barrel.

Preferably, the present invention includes a flotation means for floating at least a portion of the permeable enclosure substantially at the surface of the water.

BRIEF DESCRIPTION OF THE DRAWINGS

The present invention will become more fully understood from the following detailed description of a preferred but non-limiting embodiment thereof, described in connection with the accompanying drawings, wherein:

FIG. 4A shows a first embodiment of a fishing rod disposed in the retracted position.

FIG. 4B shows a first embodiment of a fishing rod disposed in the extended position.

MODES FOR CARRYING OUT THE INVENTION

Figure 1:
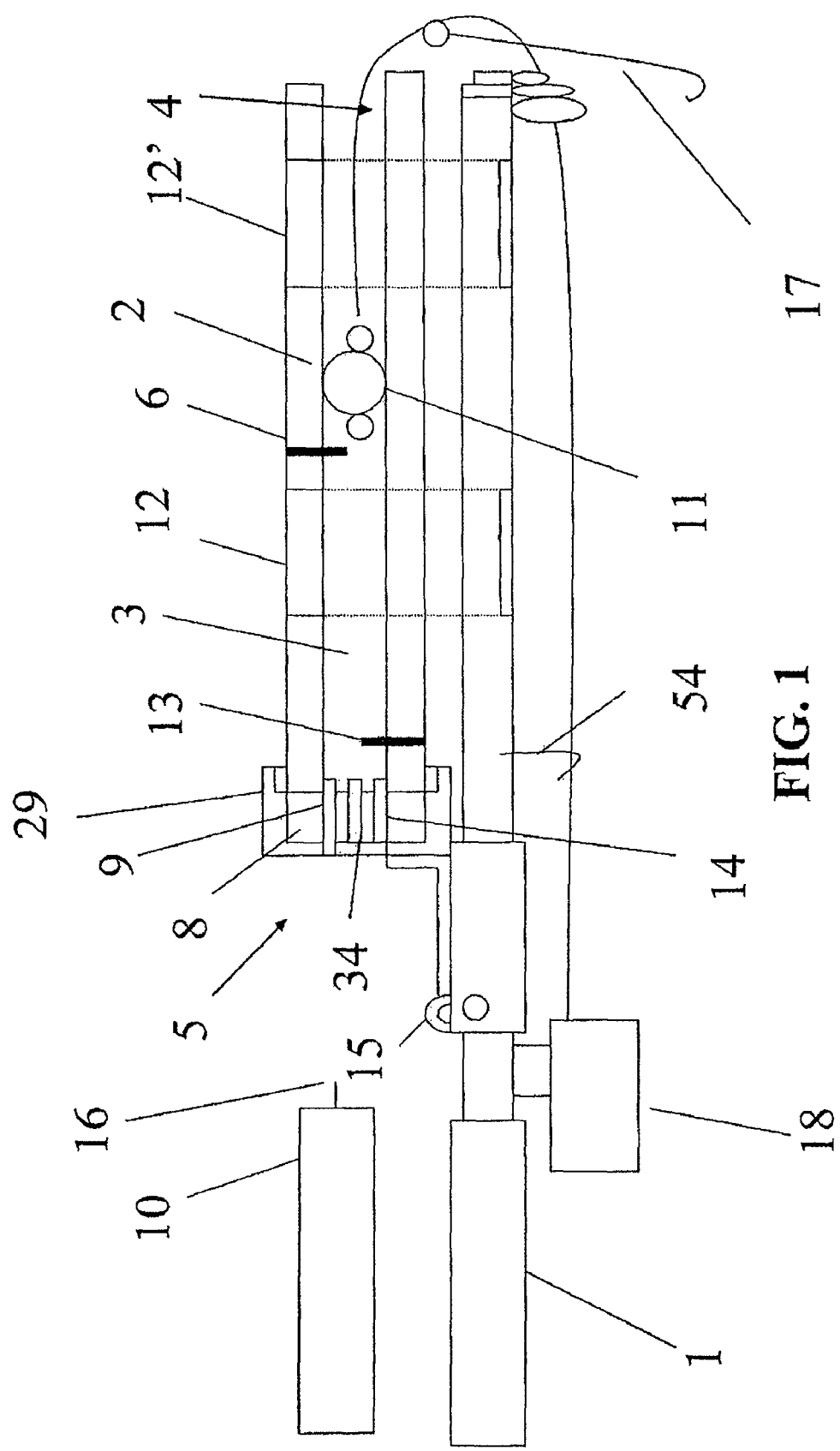
FIG. 1 depicts a side cut-away view of a first embodiment of the present invention releasably attached to a fishing rod.

FIG. 1 depicts a side view of a first embodiment of the present invention releasably attached to a fishing rod (1).

The present invention includes a barrel (2) having a first end (4), and, a first region (3) inside the barrel (2) for receiving an explosive propellant. The first region (3) is substantially bounded by a protrusion (6) and a second end (5) of the barrel (2). The barrel (2) includes a substantially circular-shaped cross-section. In the first embodiment, the barrel (2) includes a 40 cm length of PVC pipe. The choice of materials and thickness of the barrel (2) would be selected by a person skilled in the art such that it would withstand the explosive force of an expanding propellant within the barrel (2). It would be understood by a person skilled in the art that in alternative embodiments of the present invention, the barrel may be either longer or shorter than 40 cm and this choice of dimensions will depend upon the individual needs and circumstances of the user.

The first end (4) of the barrel (2) includes an opening through which a sinker (11) may be both inserted into, and propelled from. The second end (5) of the barrel (2) includes a lid (8) which releasably engages with the second end (5) by way of a screw-thread arrangement. The lid (8) includes an inlet valve (9) through which propellant is able to be fed into the barrel (2) from a canister (10). The lid (8) also includes a pressure valve (34) which allows pressure to be released from the barrel (2) when a threshold pressure level is exceeded inside the barrel (2).

Figure 3:
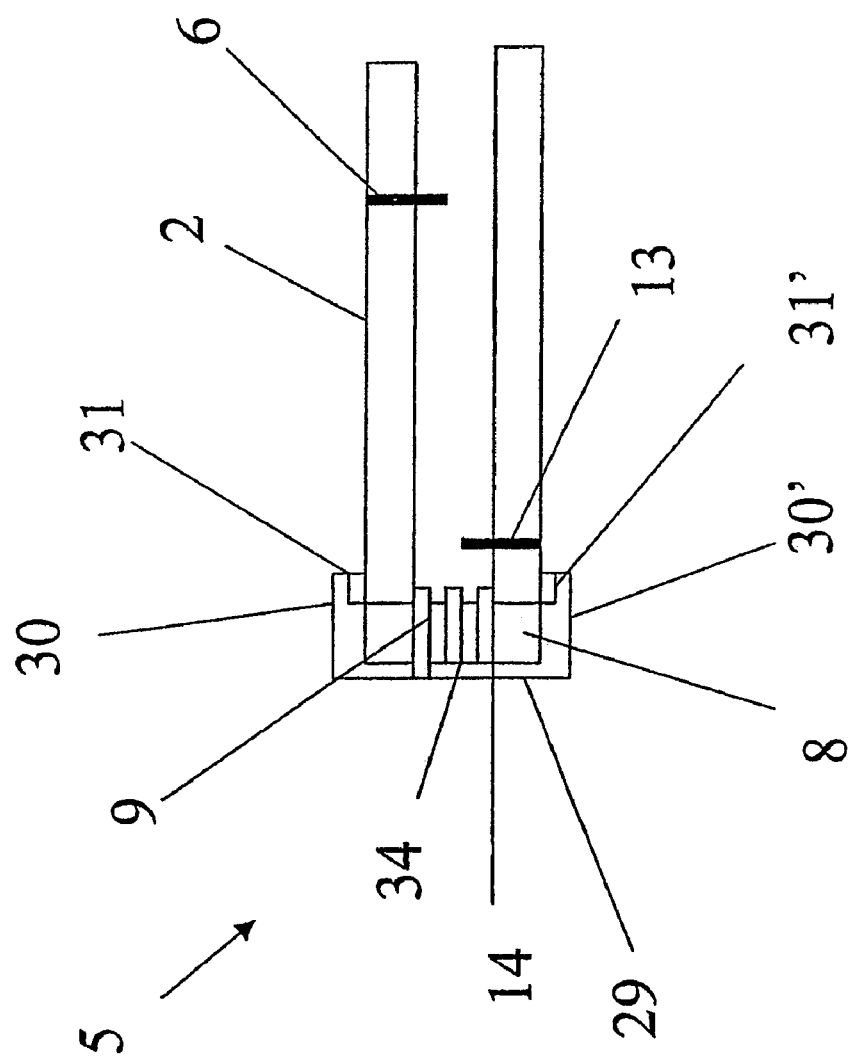
FIG. 3 shows a first aspect of the first embodiment of the present invention and in particular the second end of the barrel including the lid and cap.

A releasably attachable cap (29) is also secured to the second end (5) of the barrel (2) so as to cover the lid (8) and thereby additionally secure the lid (8) to the barrel (2). The cap (29) includes a pair of resilient arms (30,30') which snap fit around a pair of complementary protrusions (31,31') disposed on the second end (5) of the barrel (2) as shown in FIG. 3.

FIG. 1 also shows a propellant canister (10) which releasably stores a propellant comprising of a mixture of butane and air prior to being fed into the barrel (2). The propellant canister (10) includes a nozzle (16) which is adapted to engage with the inlet valve (9) of the lid (8) whereupon the propellant is able to be controllably fed in to the barrel (2).

The barrel (2) also includes a first region (3) which is substantially bounded by the protrusion (6) and the second end (5) of the barrel (2). The protrusion (6) protrudes into the barrel (2) via an aperture disposed on the barrel (2) and is adapted to impede the sinker (11) from moving in to the first region (3). The first region (3) is releasably sealed by inserting a sinker (11) into the first end (4) of the barrel (2) whereupon the sinker (11) abuts against the protrusion (6) protruding into the barrel (2) and releasably seals the first region (3) of the barrel (2). The sinker (11) in this first embodiment is substantially spherical or cylindrical and includes substantially the same diameter as the cross-sectional shape of the barrel (2) to provide a relatively snug fit.

A plurality of apertures are disposed along the length of the barrel (2) in which the protrusion (6) may be selectively inserted. The apertures in which the stopper (6) has not been inserted are releasably sealed using plugs. It would be appreciated by a person skilled in the art that by selectively altering the positioning of the protrusion (6) along the length of the barrel (2) the volume of the first region (3) of the barrel (2) is adjustable and subsequently, the amount of propellant that may be fed into the first region (3) is controllable.

The barrel (2) is releasably attached to the fishing rod (1) by way of a pair of resilient metal clamps (12,12') as shown in FIG. 1. A top surface of the barrel (2) and a bottom surface of the fishing rod (1) include grooves which are contoured to receive the clips (12,12') when the barrel (2) is releasably attached to the fishing rod (1). The grooves assist in preventing the barrel (2) from being dislodged from the fishing rod (1). Other mechanisms and arrangements may be employed in alternative embodiments of the first embodiment to serve this function.

The propellant in the first region (3) is ignited by an ignition means which includes a "spark plug" (14) such as is commonly used to ignite a gas stove, a gas barbecue or the like. The spark plug (14) is actuated by a trigger button (15) that is mounted to the handle of the fishing rod (1). The spark plug (14) is disposed on the lid (8) of the second end (5) as shown in FIG. 1. A screw (13) is positioned to protrude from the bottom of the barrel (2) approximately 1 cm away from the spark plug (14). When the trigger button (15) is depressed, an electric current is transmitted to the spark plug (14) and sparks are generated by the electric potential arising between the spark plug (14) and the nearby screw (13). As shown in FIGS. 4A and 4B, the fishing rod (1) includes a first part (19) coupled to a second part (20) wherein the second part (20) is telescopically extendable from the first part (19). The first part (19) of the fishing rod (1) includes a hollow cavity (22) in which the second part (20) is housed when disposed in the retracted position relative to the first part (19). FIG. 4A shows the fishing rod (1) disposed in the retracted position. A spring (21) is positioned within the cavity (22) of the first part (19) such that it biases the second part (20) of the fishing rod (1) into the extended position. FIG. 4B shows the fishing rod (1) disposed in the extended position.

The second part (20) is able to be releasably held in the retracted position by means of a releasable locking mechanism (23). The releasable locking mechanism (23) includes a lever (23) which is pivotally movable between a lock position and a release position. When the second part (20) is retracted in to the first part (19) a first opening (24) disposed on the first part (19), and a second opening (24') disposed on the second part (20), become substantially aligned. The lever (23) is able to be pivoted in to the lock position, whereby a hooked end (28) of the lever (23) is received in to the substantially aligned first and second openings (24,24') thereby releasably locking the second part (20) to the first part (19). When the lever (23) is pivoted into the release position, the hooked end (28) of the lever (23) is manoeuvred outwardly of the substantially aligned openings (24,24'), whereby the second part (20) is able to be freely moved in to the extended position relative to the first part (19) by the force of the spring (21). The fishing rod includes two eyelets—a first eyelet (55) disposed on the first part (19) of the fishing rod, and a second eyelet (55') disposed on the second part (20) of the fishing rod. The eyelets (55, 55') may be pivotably coupled to the first (19) and second (20) parts and adapted to be compactly folded against the first and second parts (19, 20) of the fishing rod. The eyelets (55, 55') may be spring biased to extend substantially perpendicularly relative to the first and second parts (19, 20). The fishing rod further includes an "open runner" (54) disposed on the first part of the fishing rod upon which the fishing line is suspended.

In use, the user would firstly decide upon the desired distance over which he or she wishes to propel the sinker (11), and hence, the attached fishing line, hook and bait. In the present embodiment, this distance is approximated by controlling the amount of propellant that is fed into the barrel (2). In the first embodiment, the amount of propellant that is fed into the barrel (2) is constrained by the choice of volume of the first region (3) in the barrel (2) which has been selected by the user. This adjustment of the first region (3) is achieved by selectively moving the protrusion (6) amongst the plurality of apertures disposed along the surface of the barrel (2).

The fishing rod (1) includes a screw-on base (570) which is able to be interchanged with other screw-on bases of varying dimensions as the need arises. For instance, a user may seek to screw on a base which is suitable for being wedged within a narrow crevice in a rock surface, or alternatively, the user may seek to screw on a more pointed base which is more suitable for being driven in to sand on a beach and thus anchoring the fishing rod to the beach surface. By being able to remove the screw-on base from the fishing rod, this may also allow greater ease of cleaning and maintenance to be conducted upon the inside of the fishing rod.

The fishing line is set on a 3-way swivel as shown in FIG. 1—one line being for the hook (17) and bait, a second line being for the sinker (11), and a third line being connected to the fishing reel (18). In order to propel the line and sinker, a user would insert the sinker (11) into the first end (4) of the barrel (2) until it abuts against the protrusion (6) thus releasably sealing the first region (3) of the barrel (2).

The propellant canister (10) is thereafter attached to the second end (5) of the barrel (2) whereby the propellant is able to be controllably fed in to the releasably sealed first region (3) through the inlet (9) of the barrel (2). In the present example, the propellant that is used is butane gas. When the first region (3) of the barrel (2) has been filled with the butane, the canister (10) is removed.

In order to propel the hook (17) line and sinker (11) from the fishing rod (1) the user presses the ignition trigger button (15) disposed on the handle of the fishing rod (1) which causes the butane to ignite and expand, and thereby propelling the sinker (11) from the barrel (2).

It should be noted that prior to propelling the hook, line and sinker from the barrel (2) attached to the fishing rod (1), the fishing rod (1) is arranged in the retracted position and then subsequently arranged into the extended position after the hook, line and sinker have been propelled. In order for the butane to be effectively ignite, the butane is pre-mixed with air in the butane canister (10). The proportion of air to butane is variable depending upon the specific requirements of the user.

Figure 2:
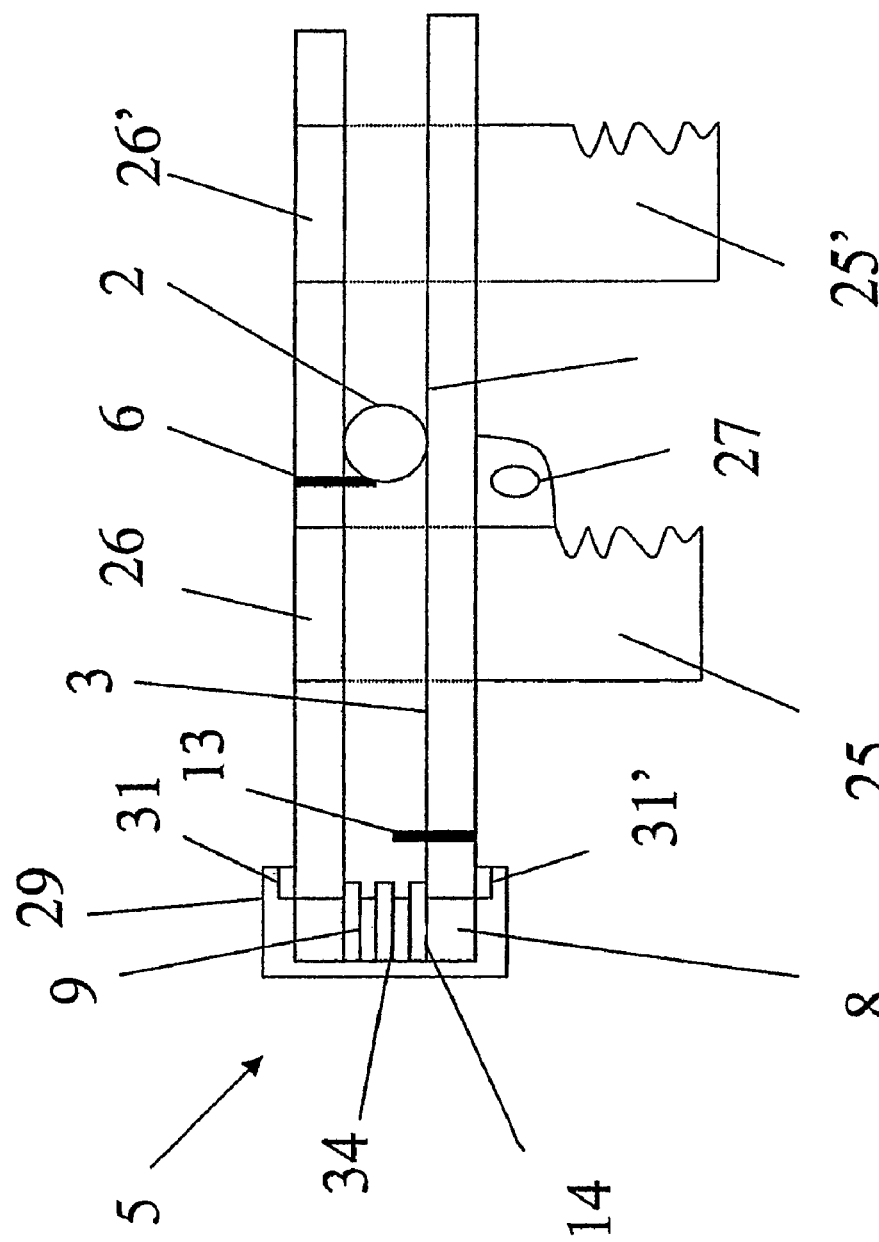
FIG. 2 shows the first embodiment of the present invention detached from the fishing rod and with releasably attachable handle grips mounted to the barrel in a gun-like fashion.

In the first embodiment of the present invention, the barrel (2) is also able to be detached from the fishing rod (1) such that the fishing rod (I) may be used conventionally. Also, when the barrel (2) is detached, a pair of handle grips (25,25') are releasably attachable to the barrel (2) such that the barrel (2) is able to be ergonomically handled in a gun-like fashion as shown in FIG. 2.

The handle grips (25,25') include clamps (26,26') which are adapted to be received in the grooves disposed on the barrel. A trigger button (27) is disposed on a rearward handle grip (26) which actuates the spark plug (14). In the present embodiment, the trigger button (27) is releasably attachable and may be selectively re-positioned upon the fishing rod, the barrel or any other suitable location as determined by the user.

Figure 5:
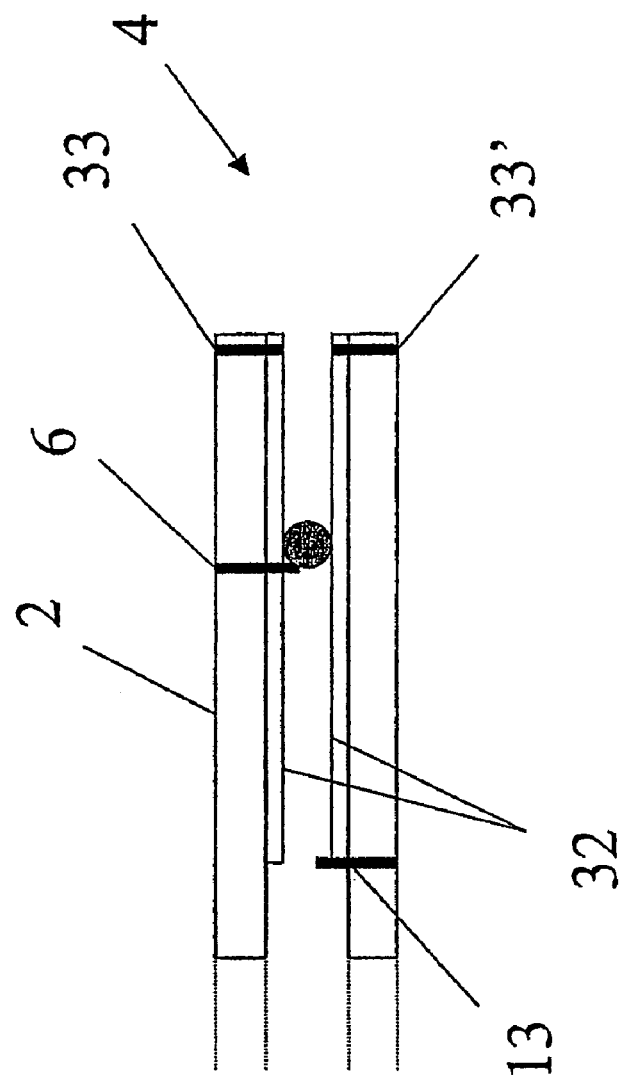
FIG. 5 depicts a cut-away side-view of a first aspect of a barrel extension for releasable attachment to the barrel of the first embodiment of the present invention.

The first embodiment also includes a cylinder (32) which is releasably attachable to the first end (4) of the barrel (2) as shown in FIG. 5. The cylinder (32) includes a circular-shaped cross-section having a relatively smaller diameter than that of the barrel (2). The cylinder (32) is adapted to receive a sinker and/or burly ball having a different size. The cylinder (32) is able to be inserted in to the barrel (2) and releasably locked in to place using screws (33,33'). It would be appreciated by a person skilled in the art that a range of difference cylinders having various cross-sectional dimensions can be selectably attached to the barrel (2) such that a range of sinker and/or burly ball shapes and dimensions can be suitably accommodated in the barrel (2) of the first embodiment.

Figure 6:
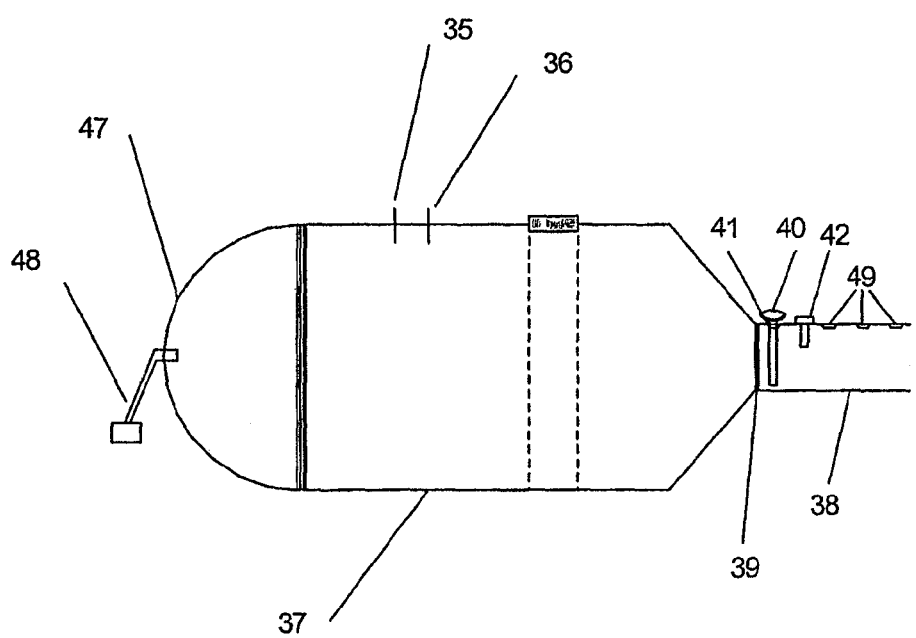
FIG. 6 depicts a second embodiment of the present invention releasably attached to a fishing rod.

FIG. 6 depicts a second embodiment of the present invention. In the second embodiment, the inlet valve (35) and the pressure valve (36) are disposed on a side of the barrel (37) as shown in FIG. 6. The igniter (48) is disposed on the cap (47) which is attached to the barrel (37) by screw thread engagement.

A cylinder (38) is releasably attachable to the first end of the barrel (37) by way of screw-thread (39) engagement as shown in FIG. 6. The cylinder (38) is of a different diameter to that of the barrel (37). A protrusion (40) protrudes in to the interior of the cylinder (38) via an aperture (41) disposed on the lateral surface of the cylinder (38), adjacent to an end of the cylinder (38) which is to be attached to the barrel (37). The protrusion (40) seeks to prevent a sinker, burley ball or the like that has been inserted in to it from entering in to the first region (3).

The cylinder (38) also includes a depressable button (42) which protrudes into the cylinder (38) via an aperture (43) disposed on a lateral surface of the cylinder (38). The depressable button (42) is positioned between the protrusion (40) and an end of the cylinder (38) which is not attached to the barrel (37) as shown in FIG. 6. Different cylinders of varying diameter may be attachable to the barrel in this way in order to accommodate a varying range of sinker sizes.

When a sinker is loaded in to the cylinder (38), the sinker first comes in to abutting contact with the depressable button (42). As the sinker is forced against the depressable button (42), the depressable button (42) retracts outwardly of the cylinder (38) such that the sinker is able to move further in to the cylinder (38). When the sinker has passed the depressable button (42), the depressable button (42) is able to return to its previous position protruding inwardly of the cylinder (38). The sinker proceeds further in to the cylinder (38) until it abuts against the protrusion (40).

The depressable button may be selectably inserted in to the cylinder via a plurality of apertures (49) disposed along a length of the cylinder (38).

When propellant is ignited inside the barrel (37), the expansion force of the propellant forces the sinker outwardly of the cylinder (38). In doing so, the force of the outwardly moving sinker is sufficient to move past the depressable button (42) and be propelled out of the cylinder (38).

Figure 8:
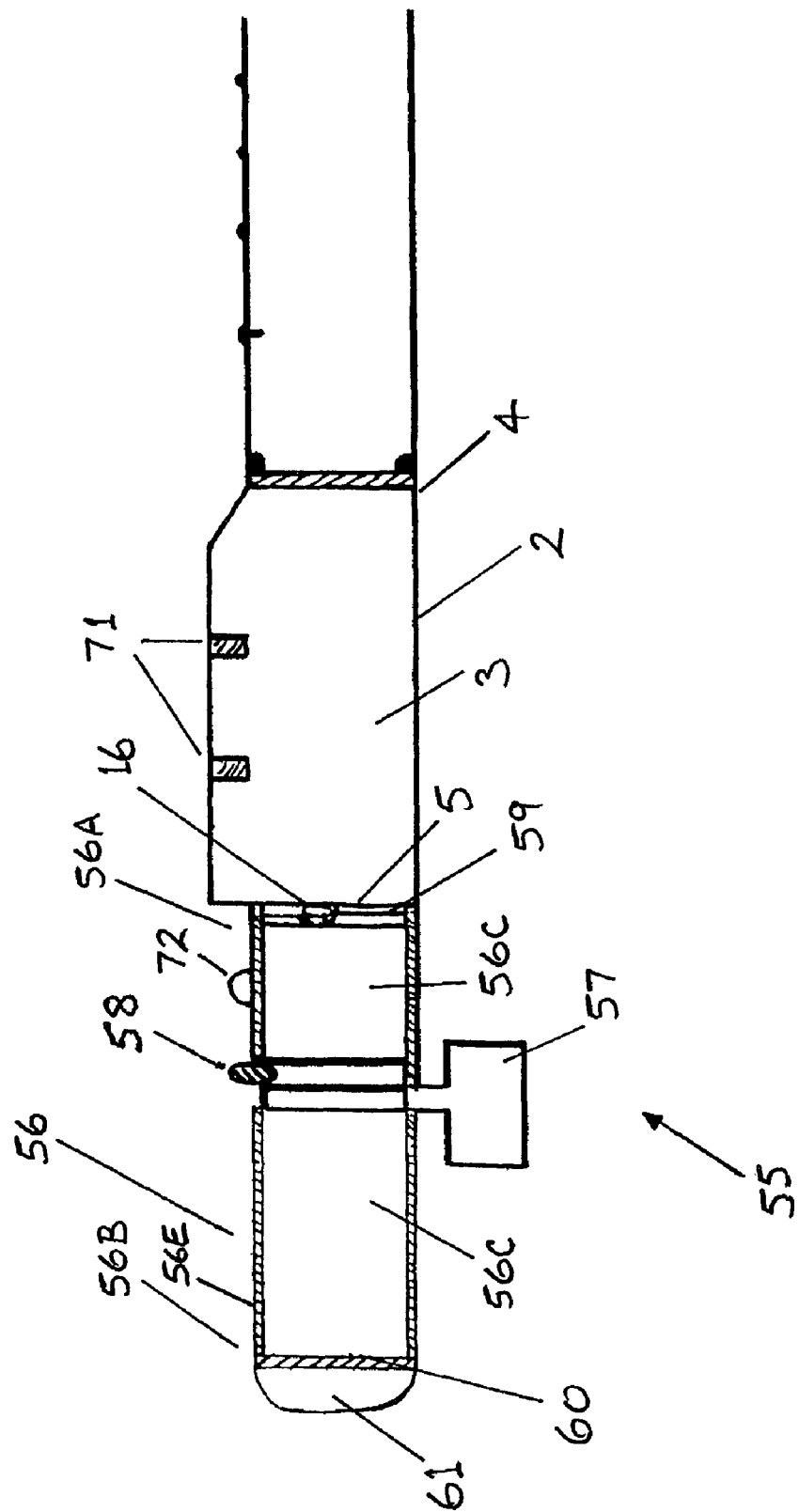
FIG. 8 depicts a side transparent view of a third embodiment of the present invention.

FIG. 8 depicts a third embodiment (62) of the present invention in which a handle (56) is releasably attachable to the barrel (2) at the second end (5) of the barrel (2). The handle is releasably attachable to the second end (5) of the barrel (2) by screw-thread engagement but it is conceivable that they could be snap-fitted together in alternative embodiments.

The handle (56) includes a first end (56A) and a second end (56B) wherein the first end (56A) of the handle (56) is releasably engageable with the second end (5) of the barrel (2). The handle (56) also includes a housing (56C) adapted for releasably receiving a propellant canister (not shown), and, a means of selectably moving the propellant canister within the housing (56C) between at least a first and a second position.

When the propellant canister is arranged in the first position in the housing (56C), the propellant canister engages with the inlet nozzle (16) disposed on the second end (5) barrel (2) so that propellant is able to be supplied into the first region (3) of the barrel (2), and, when arranged in the second position in the housing (56C), the propellant canister is disengaged from the inlet nozzle (16) so that propellant is not able to be supplied into the first region (3) of the barrel (2).

The handle (56) also includes an outer surface (56E) with a rubber layer adapted for gripping by a user's hand. The handle (56) further includes a means of mounting a fishing line spindle (57) on the outer surface (56E). The handle (56) includes an outer shape characteristic resembling a fishing rod handle.

The means of selectably moving the propellant canister within the housing includes a depressable button (58) extending inwardly of the housing (56C) from the outer surface (56E). When pressed inwardly of the housing (56C), the depressable button (58) is adapted to abut against a rear of the propellant canister so as to force the propellant canister towards the second end (5) of the barrel (2) and into the first position within the housing (56C). When the depressable button (58) is released, a biasing means (59) disposed between the propellant canister and the barrel (2) urges the propellant canister away from the second end (5) of the barrel (2) into the second position. The biasing means (59) includes a coils spring.

The handle (56) includes an opening (60) at the second end including a cap (61) for covering the second end (56B) of the handle (56). The propellant canister is able to be slidably inserted into the housing (56C) via the opening (60) when the cap (61) is removed. When inserted into the housing (56C), the propellant canister is able to be initially positioned between the depressable button (58) and the first end (56A) of the handle (56).

FIG. 8 also shows that the third embodiment includes a different ignition means arrangement. In this embodiment, the ignition means includes a plurality of spark plugs (71) mounted on the barrel (2) so as to be able to ignite propellant at various positions along a length of the first region (3) of the barrel (2). The ignition means is able to ignite the propellant at the different locations within the first region (3) either selectively, or, concurrently.

Where the ignition means is required to selectively ignite propellant at different locations in the first region (3) of the barrel (2), a switch/actuator (72) is employed to control which of the plurality of spark plugs (71) or the like are to be fired within the first region (3) of the barrel (2) at any given time so as to ignite the propellant. Similarly, the switch (72) can be adjusted so that all spark plugs (71) or the like are adapted for firing simultaneously.

Figure 7A:
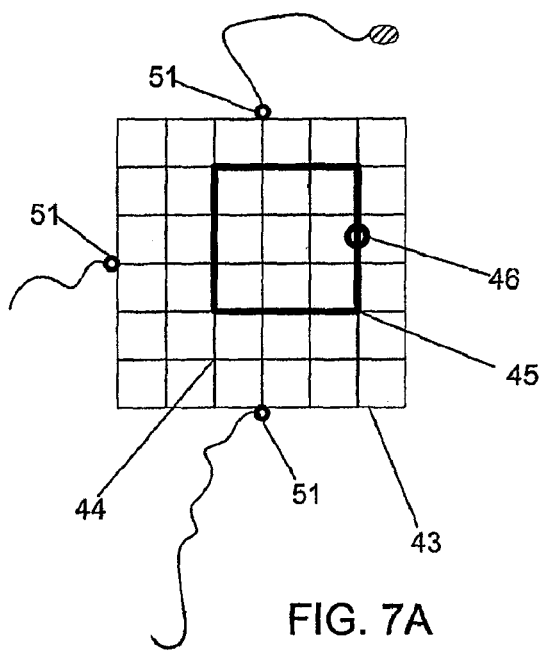
FIGS. 7A, 7B and 7C depict three configurations of a fourth embodiment of the present invention.
Figure 7B:
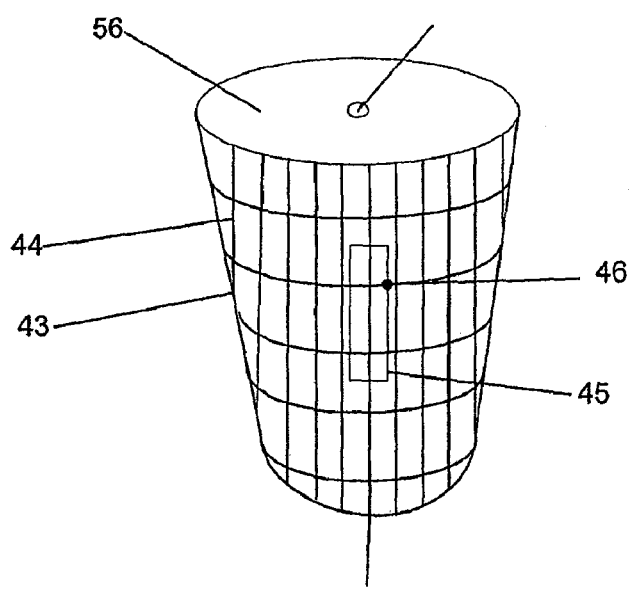
Figure 7C:
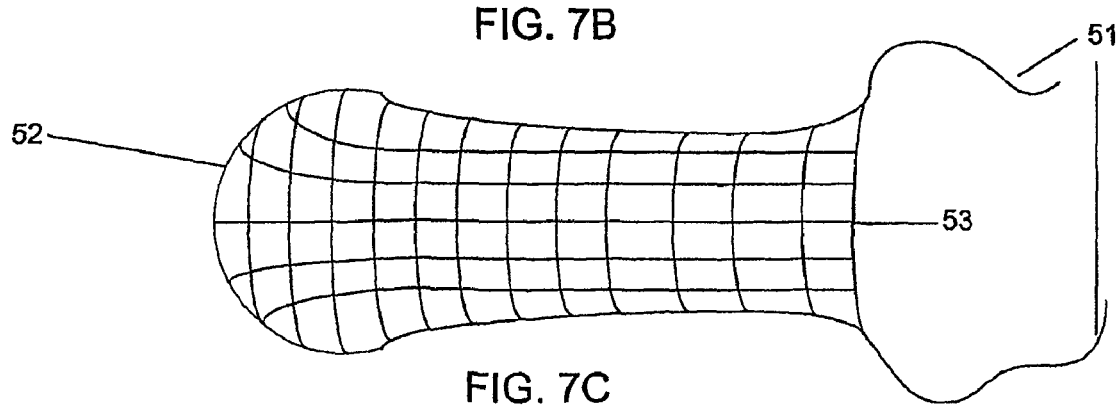

FIGS. 7A, 7B and 7C shows various configurations of a fourth embodiment of the present invention, including a burley cage (43) for releasably containing burley. The cage (43) includes a plastic material and at least one meshed surface (44) to allow water to permeate into the interior of the cage.

The cage (43) also includes a door (45) which may be releasably sealed using a latch (46). Burley is introduced into the cage (43) through the door (45). The door (45) is thereafter locked to prevent escape of the burley. When the cage (43) is submerged in water, and burley is contained within the cage (43), the water is able to permeate into the cage (43) such that the burley may gradually be dissolved into the surrounding water.

The burley cage (43) is also adapted to be propelled by either the first and/or second embodiments of the present invention. For instance, the cage would be shaped to complement the interior space of the cylinder and/or barrel.

Three swivel points (51) are included on the cage (43) to allow the cage (43) to be attached to at least one fishing line. For instance a line attached to a first swivel point may connect the cage (43) to a fishing reel, a second line may connect the cage with a sinker, and a third line may connect the cage with a hook.

The fourth embodiment is able to float by including a buoyant material such as foam or rubber with the cage (43). For instance, FIG. 7B shows a variation of the fourth embodiment wherein a top surface (56) of the cage (43) includes rubber to ensure that the cage (43) partially floats.

Alternatively, the fourth embodiment may be implemented using a flexible net (52) for enclosing a portion of burley such as a small fish or the like. The net (52) includes an opening (53) through which the burley is inserted into the net (52), and at least one string (51) for tying the opening.

It would be understood by a person skilled in the art that the first and second embodiments are not limited to use in propelling burly balls and sinkers, but may be used to propel any number of objects. It would be understood by a person skilled in the art that the objects that is propelled from the barrel need not be spherical, but may be cylindrical, tubular or any other suitable shape.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge in Australia.

The invention claimed is:

1. An apparatus for propelling a projectile, said apparatus including:
    a barrel having a first end and a releasably sealed first region,
    wherein the first region of the barrel includes a space within the barrel substantially bounded by a second end of the barrel, wherein the barrel includes a plurality of apertures along a longitudinal length thereof, said plurality of apertures extending through the barrel from an exterior of the barrel to an interior of the barrel so as to be transverse to a longitudinal axis of the barrel, and wherein all of the plurality of apertures being aligned in a row which is generally parallel with the longitudinal axis of the barrel;
    a protrusion for selective insertion within any one of the apertures along the longitudinal length of the barrel to selectively adjust a volume of the first region,
    wherein the protrusion extends radially-inwardly of the barrel in a substantially transverse orientation to an elongate axis of the barrel;
    one or more seals for sealing a remainder of the apertures into which the protrusion is not selectively inserted along the length of the barrel;
    a means for controllably feeding a propellant into the releasably sealed first region; and
    a means of expanding the propellant whereby the expansion of the propellant causes a projectile disposed within the barrel to be propelled outwardly of the barrel via the first end.

2. An apparatus as claimed in claim 1 wherein the barrel includes a pipe having a cylindrical cross-section.

3. An apparatus as claimed in claim 1 wherein the barrel includes a polyvinyl chloride material.

4. An apparatus as claimed in claim 1 wherein the propellant includes butane gas.

5. An apparatus as claimed in claim 1 wherein the propellant includes a mixture of butane gas and air.

6. An apparatus as claimed in claim 1 wherein, when the first region of the barrel is releasably sealed, it substantially prevents the propellant disposed within the first region from escaping.

7. An apparatus as claimed in claim 1 wherein, the first region of the barrel is releasably sealed by the projectile loaded into the barrel via the first end, whereby the projectile abuts against the protrusion protruding into the barrel to form the releasably sealed first region.

8. An apparatus as claimed in claim 1 wherein the apparatus includes the projectile including at least one of:
    a sinker; and
    a burly pellet.

9. An apparatus as claimed in claim 1 wherein, the means for controllably feeding a propellant comprising the propellant being stored in a canister before being fed into the barrel.

10. An apparatus as claimed in claim 9 wherein the canister is able to be mounted to the barrel, whereby propellant within the canister is able to be delivered into the barrel.

11. An apparatus as claimed in claim 1 including a cap removably attachable to the second end of the barrel.

12. An apparatus as claimed in claim 11 wherein the cap includes a pressure valve to allow for automatic release of at least some pressure from the first region of the barrel when a pressure level within the first region exceeds a predetermined pressure threshold.

13. An apparatus as claimed in claim 1 including a shock-absorbent material to absorb the shock waves caused by the expanding propellant.

14. An apparatus as claimed in claim 13 wherein the shock-absorbent material includes at least one of: a gel; and rubber.

15. An apparatus as claimed in claim 13 wherein, the shock-absorbent absorbent material is disposed on the cap.

16. An apparatus as claimed in claim 1 wherein the means of expanding the propellant includes an ignition means for igniting the propellant.

17. An apparatus as claimed in claim 16 wherein the ignition means includes a spark plug.

18. An apparatus as claimed in claim 16 including a trigger for triggering the ignition means.

19. An apparatus as claimed in claim 18 wherein the trigger means is adjustably positionable relative to the barrel.

20. An apparatus as claimed in claim 16 wherein the ignition means is adapted to ignite the propellant at a plurality of locations within the first region.

21. An apparatus as claimed in claim 20 wherein the ignition means includes a plurality of spark plugs arranged at varying locations along the length of the barrel.

22. An apparatus as claimed in claim 21 wherein each of the plurality of spark plugs are able to be fired either concurrently or selectively.

23. An apparatus as claimed in claim 1 including an attachment means for releasably attaching the apparatus to a fishing rod.

24. An apparatus as claimed in claim 23 wherein the attachment means includes a clamp.

25. An apparatus as claimed in claim 1 including a removably attachable handle grip.

26. An apparatus as claimed in claim 25 the removably attachable handle grip further including a pair of removably attachable handle grips.

27. An apparatus as claimed in claim 1 in combination with a handle, the handle including:
a first end and a second end, the first end of the handle being releasably engageable with the second end of the barrel;
a housing adapted for releasably receiving a propellant canister; and
the means of controllably feeding a propellant comprising a means for selectively moving the propellant canister within the housing between at least a first and a second position wherein, when the propellant canister is arranged in the first position, the propellant canister engages with the barrel so that propellant is able to be supplied into the first region of the barrel, and, when arranged in the second position, the propellant canister is disengaged from the barrel so that propellant is not able to be supplied into the first region of the barrel.

28. An apparatus as claimed in claim 27 wherein the handle includes an outer surface adapted for gripping by a user's hand.

29. An apparatus as claimed in claim 28 wherein the outer surface includes a rubber layer.

30. An apparatus as claimed in claim 27 wherein the handle includes a means of mounting a fishing line spindle on an outer surface thereof.

31. An apparatus as claimed in claim 27 wherein the means of selectably moving the propellant canister within the housing includes:
a depressable button extending inwardly of the housing from an outer surface of the housing, whereby when pressed inwardly of the housing, the depressable button is adapted to abut against a rear of the propellant canister so as to force the propellant canister towards the second end of the barrel and into the first position within the housing; and
a biasing means disposed between the propellant canister and the barrel which urges the propellant canister away from the second end of the barrel into the second position when the depressable button is released by the user.

32. An apparatus as claimed in claim 31 wherein the biasing means includes a spring.

33. An apparatus as claimed in claim 27 wherein the handle includes an opening disposed at the second end including a cap for covering the opening.

34. An apparatus as claimed in claim 33 wherein the propellant canister is able to be slidably inserted into the housing via the opening when the cap is removed.

35. An apparatus as claimed in claim 27 wherein the handle includes a shape characteristic resembling a fishing rod handle.

36. An apparatus as claimed in claim 1 in combination with a fishing rod, wherein the fishing rod includes:
a first part coupled to a second part wherein said first and second parts are adjustably arrangeable relative to each other between at least a first and a second position;
wherein when disposed in the first position, the second part is retracted relative to the first part;
and when disposed in the second position, the second part is extended relative to the first part;
a biasing means for biasing the first part and second part into the second position;
and a releasable securement means for holding the first part and the second part in the first position, whereby release of said securement means allows the first and second parts to be urged into the second position as a result of the biasing means.

37. An apparatus as claimed in claim 36 wherein the releasable securement means includes a latch.

38. An apparatus as claimed in claim 36 including eyelets disposed along lengths of the first and second parts.

39. An apparatus as claimed in claim 38 wherein at least one of the eyelets is pivotably coupled to the second part and is adapted to be compactly folded against the second part.

40. An apparatus as claimed in claim 39 wherein the eyelets are spring biased to extend substantially perpendicularly relative to the second part.

41. An apparatus as claimed in claim 36 including a means of extending a length of the barrel.

42. An apparatus as claimed in claim 41 wherein the means of extending the length of the barrel includes a barrel extension which is releasably attachable to the first end of the barrel.

43. An apparatus as claimed in claim 42 wherein the barrel extension is attachable to the first end of the barrel by screwing the barrel extension onto the first end of the barrel.

44. An apparatus as claimed in claim 43 wherein the barrel extension may include different dimensions to that of the barrel.

45. An apparatus as claimed in claim 36 including a depressable tab extending inwardly of the barrel for releasably retaining the projectile within the barrel before it is propelled outwardly of the barrel via the first end.

46. An apparatus as claimed in any one of claims 1 to 45, further comprising the projectile, wherein the projectile includes a burley dispenser for controllably dispensing burley in water, the burley dispenser including:
a permeable enclosure having a releasably sealable opening via which a barley pellet is able to be inserted into the permeable enclosure;
said burley tablet being adapted to disintegrate upon contact with water into burley sub-particles having relatively smaller dimensions than the burley tablet;
whereby the burley sub-particles are able to flow outwardly of the permeable enclosure via a permeable surface of the permeable enclosure whilst the permeable surface substantially retains the burley tablet internally of the enclosure.

47. An apparatus as claimed in claim 46 wherein the permeable enclosure includes a rigid plastic material.

48. An apparatus as claimed in claim 46 including a means of attaching the burley dispenser to a fishing line whereby the burley dispenser is able to be cast out.

49. An apparatus as claimed in claim 46 wherein the burley dispenser includes a flotation means for floating at least a portion of the permeable enclosure.

50. A method of propelling a projectile from a fishing rod including the steps of:
- (i) providing the apparatus as claimed in claim 1;
- (ii) selectively setting the volume of the releasably sealable first region of the barrel of the apparatus, and wherein the volume of the first region is set by unsealing one of the apertures and inserting therein the projection;
- (iii) feeding the propellant into the first region of the barrel when sealed; and
- (iv) expanding the propellant whereby the expanding propellant causes a projectile disposed within the barrel to be propelled outwardly of the barrel.

\* \* \* \* \*

UNITED STATES PATENT AND TRADEMARK OFFICE
CERTIFICATE OF CORRECTION

PATENT NO. : 7,712,244 B2  
APPLICATION NO. : 11/595840  
DATED : May 11, 2010  
INVENTOR(S) : Tautofi Taurik'i Mamae Page 1 of 1

It is certified that error appears in the above-identified patent and that said Letters Patent is hereby corrected as shown below:

On the title page item (74), Line 2, change "Olsen" to --Olson--.

At Column 12, Line 64, Claim 15, after "shock-absorbent" delete "absorbent".

At Column 14, Line 53, Claim 46, change "barley pellet" to --burley tablet--.

Signed and Sealed this  
Tenth Day of May, 2011

David J. Kappos  
*Director of the United States Patent and Trademark Office*